United States Patent Office 2,849,417
Patented Aug. 26, 1958

2,849,417

AMINE-EPOXIDE ADHESIVE COMPOSITION CONTAINING THIURAM SULFIDE AND PROCESS OF MAKING SAME

Tung Tsang, Minneapolis, Minn., assignor to Minneapolis-Honeywell Regulator Company, Minneapolis, Minn., a corporation of Delaware No Drawing. Application May 16, 1956
Serial No. 585,180

11 Claims. (Cl. 260—37)

This invention relates to new complex amino-polysulfide-epoxide compositions including epoxy ether condensation polymers having the following structure:

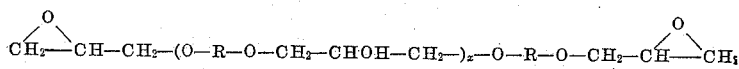

wherein "$x$" stands for a number (such as 1, 2, 3, etc.) and "R" stands for the hydrocarbon radical of a dihydric phenol such as bis-(4-hydroxyphenyl)-2,2-propane ("bis-phenol"). Epoxy ether resins made by condensing epichlorhydrin and bis-(4-hydroxyphenyl)-2,2-propane (hereinafter referred to as "bis-phenol") are available commercially.

Compositions according to the present invention are particularly valuable for use as adhesives, and also find use as casting resins, impregnating compounds, surface coatings and the like.

In order for any composition to function as an adhesive, it is requisite that it adhere tenaciously to the surfaces to be bonded, and upon curing have high tensile and shear strength. The pot life (the length of time necessary for an adhesive to "set up" after it has been formulated) at ordinary room temperatures should be relatively long in order to make possible the formulation of the adhesive composition in relatively large quantities prior to use. Such a characteristic saves a considerable amount of time which would otherwise be required for the periodic preparation of small batches and the like for the requirements of the immediate future. When bonding metals or other impervious and non-porous materials, it is essential that there be no gases or volatile constituents released from the adhesive composition during curing since the presence of these gases causes bubbles or voids to form in the mass of the cured adhesive, thereby creating an inferior bond. In addition, it is desirable that the "cure" time of the adhesives be relatively short in order that the amount of equipment incidental to curing may be at a practical minimum, and also so that the bonded items may be handled and put into use as soon as possible. These cures are in most instances accomplished by means of the application of heat to the bond to be formed. Obviously, it is desirable that a good bond be achieved with a minimum number of applications or coats of adhesive as well as at relatively low curing temperatures. With presently available epoxy adhesives, these requirements and advantages are not entirely satisfied. For example, the pot life of some amine-epoxide compositions is impractically short, thereby making handling, mixing, and working of these particular formulations difficult. Conversely, some compositions of this sort may have a relatively long pot life, but these normally require rather involved curing cycles utilizing high temperatures for long periods of time for completion and hence are not desirable. Accordingly, with the novel compositions of the present invention, a combination of an extremely strong bond, a relatively long pot life, and a relatively short and simple cure cycle is obtained. The uncured material is quite fluid and is thereby easily handled.

According to the present invention, it has been found that the addition of a quantity of tetrasulfide such as, for example, dipentamethylene thiuramtetrasulfide or tetramethyl thiuramtetrasulfide to an epoxy-amine composition enhances the properties of various of these mixtures from the standpoint of increased pot-life, decreased viscosity, and improved adhesion and cohesion to various surfaces. Compositions prepared in accordance with the present invention have been found to possess unusually high tensile and shear strengths when used in adhesive applications, the shear strengths for some materials ranging up to about 5,000 p. s. i. and higher using a single "overlap" joint. Substantially higher values may be achieved using different geometrical bond configurations. This high strength, coupled together with the convenience of handling possible with compositions of the present invention make the preparation an extremely desirable one for many uses. The preparation is highly compatible with most surfaces including metals, wood, or the like, and is thus almost universally applicable as a high strength adhesive. The cured compositions are highly stable and will not deteriorate at temperatures up to about 300° F., hence the compositions find application where relatively high temperatures are to be encountered during the life of the bond.

It is therefore an important object of the present invention to produce a unique epoxy-amine-tetrasulfide composition of matter having an unusually high strength, and being particularly suitable for use as an adhesive.

It is a further object of the present invention to provide an adhesive composition which is characterized by stability at relatively high temperatures.

It is still a further object of the present invention to provide an adhesive composition which is characterized by the ability to form bonds having extremely high strength, and in particular, bonds having especially high shear strengths with various metallic substances.

Other and further objects and features of the present invention will become apparent from a reading of the following description and appended claims.

The epoxy-amine-tetrasulfide compositions of the present invention include an epoxy base resin as set forth in the above noted structural formula, and may preferably include a powdered or finely divided filler. An amine catalyst is also utilized, however the amine composition is not considered particularly critical in the preparation, since various aromatic diamines such as para para' diamino diphenylmethane, paraphenylene diamine, metaphenylene diamine, or the like; aromatic amines such as pyrrolidine or the like; or various aliphatic type diamines such as dimethylamino propylamine, ethylenediamine or the like may be utilized. Although many aromatic diamines may be utilized successfully, best results have been achieved when para para' diamino diphenylmethane is utilized as the diamine catalyst. The tetrasulfide is added to the resin-diamine composition in an amount ranging from greater than 0% up to about 5% by weight of resin and amine catalyst. Although beneficial effects are achieved through the addition of tetramethyl thiuramtetrasulfide, the dipentamethylene thiuramtetrasulfide additive is preferred. The relative proportions of the ingredients utilized in my compositions may range within the limits set forth in Table I below:

TABLE I

| Constituents: | Parts by weight |
| --- | --- |
| Epoxy base resin | 100 |
| Diamine Hardener (para para' diamino diphenylmethane) | 10–30 |
| Tetrasulfide additive | 1–10 |
| Filler | As required |

When the tetrasulfide additive is used in accordance with the amount set forth in Table I above, a tough, highly adherant, thermosetting type of adhesive composition is produced. It is noted that in the absence of the tetrasulfide additive, good release from surfaces and very little, if any, adhesion is obtained with an epoxy resin employing a para para' diamino diphenylmethane catalyst. It may be desirable in some instances to include a filler in the adhesive compositions, and the amount of the filler utilized is not critical but is more a function of the wetting characteristic or capability of the raw resin mixture. In other words, as is conventional in adhesive compositions, it is preferred that the filler be included in an amount such that the individual particles of the filler substance are thoroughly wetted by the raw adhesive composition. Various fillers have been found to be satisfactory, among these are titanium dioxide, silicon dioxide (including quartz and mica), finely divided clays such as kaolin etc., finely divided structural metals, finely divided titanates, and finely divided water insoluble high melting point metallic oxides. By the term "structural metals" reference is made to those metals commonly used in structural members or bodies, and excludes nonstructural metals such as sodium, potassium, lithium, mercury, and the like. Although a given filler may produce a good bond with almost any material upon which it is being used, it has been determined that various of these fillers are superior in certain applications. For example, a certain adhesive composition prepared in accordance with the present invention and including kaolin filler produces a superior bond for brass, whereas a similar adhesive composition utilizing titanium dioxide filler produces a superior bond for steel, other features being equal. Other desirable combinations will be readily apparent to those skilled in the art.

In accordance with the preferred modification of the present invention, the base epoxy resin and the tetrasulfide additive are thoroughly mixed in accordance with the ratios desired, and the filler, if utilized, is mixed into the resin-tetrasulfide mixture. To this composition there is added the appropriate amount of diamine hardener or catalyst including para para' diamino diphenylmethane. The pot life of these adhesive mixtures may vary in accordance with the particular diamine utilized and further with the temperature at which the material is kept. It will be realized of course that the pot life of most of these compositions may be extended indefinitely by storing at refrigeration temperatures, whereas storage at room temperature or above may correspondingly limit the pot life otherwise attainable. It has been found that compositions of the present invention utilizing para para' diamino diphenylmethane have a relatively long pot life and may be stored for many months at relatively low temperatures without loss of the desirable wetting or flow characteristics or other desirable physical properties. At room temperature, the working or pot life is about one day. The shelf life of the epoxy resin-tetrasulfide mixture (without amine hardener) is equivalent to that of the resin per se, and hence, for all practical purposes, is substantially indefinite. In a normal bonding operation, the adhesive mixture including epoxy resin, tetrasulfide additive, diamine catalyst and filler is applied to the surfaces of the material or materials to be bonded and the materials are then subjected to a heating cycle wherein the adhesive is subjected to an elevated temperature for a given period of time until curing is accomplished. It has been found that the mixtures of the present invention, employing para para' diamino diphenylmethane cure or set completely when exposed to a temperature of 250° F. for a period of four hours. The portions or bodies to be bonded, are of course, held under continuous contact pressure during curing.

It has been found that the amount of various fillers included in the resin mixture alters or modifies the thermal coefficient of expansion of the final adhesive product. Therefore, in bonding a metal to a metal, it is considered important to match as closely as possible the thermal coefficients of expansion of the adhesive to that of the metal being bonded. A significant difference in thermal coefficients will result in a weakened bond, this weakness being introduced initially during the period that the cured material is being cooled from its curing temperature to room temperature. It is also possible that in normal usage, the bonded article will be subjected to widely varying temperatures. Significantly different thermal coefficients of expansion together with different thermal conductivity characteristics will tend to create strains in the bond during temperature cycles. In order to insure strong bonds under these conditions, the thermal coefficients of expansions and thermal coefficients of conductivity should be relatively closely matched between the adhesive and the bonded parts. It is therefore advisable to incorporate in the adhesive an amount of filler adequate to provide the desired thermal characteristics in the final adhesive product. As has been previously stated, these fillers may be added in any amount up to the "fluid-wetting" ability of the resin. That is, any amount of filler may be added to a given mixture provided the ability of the final resin composition to wet the surfaces of the filler is maintained. Generally this represents a range of from 30% to 65% by weight of filler in the raw composition, depending upon the density of the filler being used. If the filler does not have an extraordinarily high or low density, and if severe temperature requirements are not to be met, about 50% by weight of filler is normally preferred.

With some resin-amine mixtures other than primary aromatic diamine cured compositions, it is desirable to permit the prepared compositions to react for a certain period of time at room or slightly elevated temperatures. This will enable the compositions to carry out an initial curing or setting reaction in which, in some cases, gas is evolved. Enabling the compositions to degasify in this manner tends to eliminate bubble problems in the cured adhesive product.

When the compositions of the present invention are employed as adhesives, a single coat of the adhesive mixture to one or both of the abutting surfaces is normally adequate for any bonding problem. Although a curing temperature of 250° F. for a period of four hours has previously been stated to be desirable, other curing cycles may also be utilized. Since the curing reaction of this composition follows the normal time-temperature relationship of organic reactions, other curing cycles utilizing a somewhat higher temperature for a shorter period of time or somewhat lower temperature for a longer period of time may be employed. In this connection, it is preferable that a temperature of about 400° F. is not exceeded for substantial periods during the curing cycle. This heat together with the exotherm of the curing reaction may cause the adhesive mass to burn or char internally. A practical upper temperature limit in the range of about 400° F. is considered tolerable without thermal degradation of the set adhesive. The addition of a small amount of a phenolic compound such as phenol, catechol, cresol, or resorcinol to the composition will accelerate the curing cycle.

Specific examples of preparation follow:

*Example 1*

The following ingredients are mixed in the amounts as follows:

Compounds: Parts by weight
- Epoxy base resin (condensation product of epichlorohydrin and bis-phenol, epoxy number 0.5) _____ 49.2
- Tetrasulfide additive (dipentamethylene thiuramtetrasulfide) _____ 2.5
- Para para' diaminodiphenylmethane _____ 12.4
- Titanium dioxide filler _____ 40

The base resin and tetrasulfide are mixed together and the titanium dioxide powder filler added. This mixture is stirred until the ingredients are thoroughly dispersed and the molten diamine catalyst is then added. The mixture is further stirred until thorough mixing of the diamine in the resin composition is achieved and the compound is then ready for use. In adhesive applications, the raw adhesive mixture is applied by brushing or otherwise to the surfaces to be bonded, contact pressure is applied to the surfaces, and the composition is cured under contact pressure for a period of four hours at 200° F., this being followed by an additional cure for four hours at 250° F. The particular composition of this example has been found to adhere tenaciously to metallic surfaces, and was found to have particularly high resistance against shearing stresses.

Example 2

The following ingredients are mixed in the amounts as shown herein:

Compounds: Parts by weight
- Epoxy base resin (condensation product of epichlorohydrin and bis-phenol, epoxy number 0.5) _____ 49.2
- Dipentamethylene thiuramtetrasulfide _____ 2.5
- Metaphenylenediamine _____ 8.2
- TiO₂ _____ 40

In carrying out the preparation of this composition, the tetrasulfide additive is dissolved in the epoxy base resin material by stirring. The filler is then added to the composition and when thoroughly mixed, the molten amine hardener is introduced into the system. Thorough dispersion of the hardener into the mixture is achieved by stirring. The previously prepared mixture is then applied to the surface of the metal parts to be bonded and is cured for a period of about four hours at 200° F. followed by a subsequent curing at 250° F. for four hours. Good bonds having unusually high tensile and shear strengths have been prepared utilizing the above mixture.

Example 3

A composition similar to that shown in Example 2 is prepared wherein tetramethyl thiuramtetrasulfide is substituted for the dipentamethylene thiuramtetrasulfide. The results in this case are substantially comparable to the case wherein the dipentamethylene thiuramtetrasulfide additive was used.

Example 4

A preparation similar to that of Example 1 was prepared wherein dimethylamino propylamine catalyst was substituted for the para para' diamino diphenylmethane catalyst. In this connection 8 grams of dimethylamino propylamine were employed in addition to the other constituents. Good adhesion and bonding strengths may be achieved with this adhesive.

Example 5

A composition similar to that prepared in accordance with Example 1 was prepared substituting paraphenylenediamine for the diamine catalyst. In this connection 8.2 grams of paraphenylenediamine were employed in the mixture. This preparation is suitable as an adhesive composition and relatively high strengths have been achieved.

Many details of composition and procedure may be varied without departing from the principles of this invention. It is, therefore, not my purpose to limit the patent granted under this application otherwise necessitated by the scope of the appended claims.

I claim as my invention:

1. A composition of matter which comprises an epoxy base resin, an amine catalyst, and a tetrasulfide taken from the group consisting of dipentamethylene thiuramtetrasulfide and tetramethyl thiuramtetrasulfide, said epoxy base resin being the condensation product of epichlorohydrin and bis-phenol.

2. A composition of matter comprising an epoxy base resin, an amine catalyst, and a tetrasulfide taken from the group consisting of dipentamethylene thiuramtetrasulfide and tetramethyl thiuramtetrasulfide, said tetrasulfide being present in said epoxy-diamine mixture in an amount ranging from greater than 0 up to about 10 parts per 100 parts of epoxy-diamine composition, said epoxy base resin being the condensation product of epichlorohydrin and bis-phenol.

3. A composition of matter which comprises an epoxy base resin, an amine catalyst, and dipentamethylene thiuramtetrasulfide, said epoxy base resin being the condensation product of epichlorohydrin and bis-phenol.

4. A composition of matter which comprises an epoxy base resin, an aromatic diamine catalyst, and a tetrasulfide taken from the group consisting of dipentamethylene thiuramtetrasulfide and tetramethyl thiuramtetrasulfide, said epoxy base resin being the condensation product of epichlorohydrin and bis-phenol.

5. A composition of matter comprising an epoxy base resin, a diamine catalyst taken from the class consisting of metaphenylenediamine and paraphenylenediamine, and a tetrasulfide composition taken from the group consisting of dipentamethylene thiuramtetrasulfide and tetramethyl thiuramtetrasulfide, said epoxy base resin being the condensation product of epichlorohydrin and bis-phenol.

6. The composition of claim 1 being further characterized in that a filler is included in the mixture ranging in an amount from 30% to 65% by weight of the composition.

7. An adhesive composition consisting essentially of an epoxy base resin, a diamine catalyst, a tetrasulfide taken from the group consisting of dipentamethylene thiuramtetrasulfide and tetramethyl thiuramtetrasulfide, and titanium dioxide filler, said epoxy base resin being the condensation product of epichlorohydrin and bis-phenol.

8. An adhesive composition consisting essentially of an epoxy base resin, a dianaline catalyst, a tetrasulfide additive taken from the group consisting of dipentamethylene thiuramtetrasulfide and tetramethyl thiuramtetrasulfide, and a filler, said epoxy base resin being the condensation product of epichlorohydrin and bis-phenol.

9. The method of preparing an adhesive bond which includes subjecting a mixture including an epoxy base resin, an amine hardener, a tetrasulfide additive taken from the group consisting of dipentamethylene thiuramtetrasulfide and tetramethyl thiuramtetrasulfide, and a filler, to heat and pressure for a period of time which is sufficient to cure said composition, said epoxy base resin being the condensation product of epichlorohydrin and bis-phenol.

10. The method of preparing an adhesive bond which includes curing a mixture including an epoxy base resin, a diamine hardener, a tetrasulfide additive taken from the group consisting of dipentamethylene thiuramtetrasulfide and tetramethyl thiuramtetrasulfide, and a filler by subjecting to temperatures of about 200° F. for a period of about four hours and thence to temperatures of about 250° F. for a period of about four hours, said epoxy base resin being the condensation product of epichlorohydrin and bis-phenol.

11. The method of preparing an adhesive bond which includes curing a mixture including an epoxy base resin, a diamine hardener, a tetrasulfide additive taken from the group consisting of dipentamethylene thiuramtetrasulfide and tetramethyl thiuramtetrasulfide, and a filler, by subjecting to temperatures in the range of about 250° F. for a period of four hours, said epoxy base resin being the condensation product of epichlorohydrin and bisphenol.

No references cited.